(12) United States Patent
Deslandes et al.

(10) Patent No.: US 6,717,579 B1
(45) Date of Patent: Apr. 6, 2004

(54) REFLECTION LINE CONTROL

(75) Inventors: Arnaud Deslandes, Boulogne (FR); David L. Bonner, Paris (FR)

(73) Assignee: Dassault Systemes, Suresnes Cedex (FR)

( * ) Notice: Subject to any disclaimer, the term of this patent is extended or adjusted under 35 U.S.C. 154(b) by 0 days.

(21) Appl. No.: 09/329,726

(22) Filed: Jun. 10, 1999

(51) Int. Cl.⁷ .............................................. G06T 17/00
(52) U.S. Cl. ...................... 345/428; 345/426; 345/420; 345/964; 700/98; 700/182
(58) Field of Search ............................ 345/6, 179, 419, 345/420, 426, 428, 723, 964; 700/98, 182; 178/18.01

(56) References Cited

U.S. PATENT DOCUMENTS 5,237,647 A * 8/1993 Roberts et al. ............. 345/419

OTHER PUBLICATIONS

J. Loos, G. Greiner and H. P. Seidel, "Modeling of Surfaces with Fair Reflection Line Pattern", International Conference on Shape Modeling and Applications, pp. 256–263, Aizu-Wakamatsu, IEEE, Mar. 1999.

European Search Report for Appl. No. 00401395.9 dated Sep. 15, 2003.

Lennings et al. "An efficient intergration of algorithms to evaluate the quality of freeform surfaces", Computers and Graphics, Pergamon Press Ltd. Oxford, GB, vol. 19 No. 6. Nov. 1, 1995. pp. 861–872.

Guid et al. "Suface interogation methods", Computers and Graphics, Pergamon Press Ltd. Oxford, GB, vol.19, No. 4. Jul. 1, 1995. pp. 557–574.

* cited by examiner

*Primary Examiner*—Mark Zimmerman
*Assistant Examiner*—Lance W. Sealey
(74) *Attorney, Agent, or Firm*—James V. Mahon; Clifford Chance US LLP

(57) ABSTRACT

In a system and method for controlling a reflection line in a CAD system and for adjusting the shape of an object to correspond to a new reflection line, a user sets a reflection line as desired, and at least one constraint on the object. The system determines a shape of the object based on the new reflection line and the constraint. The shape of the object may be determined using energy minimization. Alternatively, the system and method may use vector springs to attract the reflection line to a free-form curve set by the user, and then determine the shape of the object based on the new reflection line and the constraint.

44 Claims, 13 Drawing Sheets

REFLECTION LINE CONTROL

FIELD OF THE INVENTION

The present invention relates generally to computer-aided design (CAD), manufacturing (CAM) and engineering (CAE), and product data management (PDM II) systems and to a system and method for controlling the shape of reflection lines on the surface of an object in such CAD, CAM, CAE or PDM II systems. More particularly, the present invention provides for direct control of the reflection line and the modification of the shape of an object to correspond to a desired reflection line on the surface of the object.

BACKGROUND OF THE INVENTION

CAD systems are widely used for many types of design and manufacturing applications. Certain of these applications can be very costly in terms of user interaction time. One such interaction intensive application is object or surface design and modification.

In the computer-aided design and manufacturing of many end products, particularly those which are intended for the consumer market, the external appearance of the product plays a major role. The car industry provides a good example of this well-known fact. One significant aspect of the external appearance of the product is the way in which its surface reflects the light in the room where the product is presented to prospective buyers. This can be a car dealer showroom where neon tubes provide most of the light in the room and the prospective buyers see the reflection of the neon light as reflection lines on the external surface of the cars. It has been shown that smooth reflection lines tend to leave the consumer with a better impression of the product than erratic or misshapen reflection lines. This is why the design stylists in many consumer product manufacturing companies spend a lot of time trying to ensure that the end product will exhibit smooth reflection lines when presented in a showroom. They need to do that at the design stage, of course, before the product goes into production. It is therefore important for a CAD/CAM/CAE/PDM II application to offer design stylists the opportunity to control to the greatest extent possible the way the surface of the designed product will reflect light.

In the currently available systems, the surface of the object being designed is displayed to the user with a simulation of the reflection of a light source, say an elongated neon light source, system allows the user to alter the shape of the surface by means of free-form surface shape design techniques. Then the new reflection line is shown to the user and the process is repeated until the user is reasonably satisfied with what appears on the computer. In this process the user has no direct control over the reflection line: for the software functionalities the reflection line is only a "by-product" of the shape of the surface, whereas in many cases it is the ultimate goal of the user. This is a long and tedious trial-and-error process. There is a need for a system which would allow the user to define up front the reflection line the surface should preferably exhibit and which would then reshape the surface to attain or approximate this kind of reflection line.

A method for surface design and modification is described in an article titled Energy-Based Models for Free-Form Surface Shape Design, by George Celniker and David Gossard, ASME Design Automation Conference, February 1989, and in an article titled Linear Constraints for Deformable B-Spline Surfaces, by George Celniker and Will Welch, Association for Computing Machinery, 165–70, 1992 (Celniker et al.). In these articles a system is described which provides for the modification of the shape of a deformable surface. The system applies constraints defined by the user to the entire surface while attempting to reach an equilibrium. All changes to a surface reflect a minimization of a global energy function of the surface. Additionally, all curves are constrained by requiring an equilibrium which fixes each point and the shape of the entire curve. When using such a system for arriving at a desired (subjective) degree of smoothness for a surface, a user will often have to modify several times one or more constraints, which causes the system to go through several iterations in each of which the surface must be recalculated and displayed to the user, until the user finds the result acceptable. Celniker's constraint based model attempts to generate a smooth shape within the constraints imposed by the user, but does not address the issue of direct control of reflection lines or indirect control of the surface of an object through the use of its reflection lines.

Two different methods for surface modification are described in an article titled Correction of Local Surface Irregularities Using Reflection Lines, by Reinhold Klass, Computer Aided Design, Vol. 12, No. 2, March 1980, pp. 73–77, and in an article titled Smoothing Surfaces Using Reflection Lines for Families of Splines, by E. Kaufmann and R. Klass, Computer Aided Design, Vol. 20, No. 6, July/August 1988, pp. 312–16. These articles both describe methods for modifying a surface using reflection lines. Neither method provides for any surface constraints besides for the reflection line. These methods differ from Celniker et al. in that neither is based on a constraint based energy minimization model to guarantee global control of the surface, and no provision exists for introducing such a model. The lack of constraints other than the reflection line means that it is not possible to guarantee that the surface will not move at its boundaries. These methods demand large amounts of processing, and memory by requiring numerous calculations and reiterations to arrive at the desired reflection lines. Additionally, several user interaction may be necessary to insure that the surface shape provides the desired characteristics.

A further method for surface modification is described in an article titled Direct Highlight Line Modification on NURBS Surfaces, by Chen et al., Computer Aided Geometric Design 14 (1997) 583–601. This article describes a method for modifying a surface using highlight lines. The highlight lines differ from reflection lines in that they are viewer independent, i.e., not based on any viewer perspective, and are not subject to change based on a viewer's perspective. Thus, highlight lines are simpler to implement than reflection lines, but do not provide a realistic model for surface design or modification.

The various methods described in the literature for object modification using CAD systems are limited since they do not provide for object modification based on reflection line control while providing for constraints on the object being modified, and in consequence require time consuming user interaction to arrive at the desired result.

SUMMARY OF THE INVENTION

The present invention solves these problems and provides an apparatus and method for modifying the shape of an object, for example, a surface, by using reflection lines, while at the same time maintaining certain constraints on the object being modified. By using reflection lines an object may be modified based on a realistic viewer perspective.

The present invention provides an apparatus and method for modifying the shape of an object, for example, a surface, by defining the shape and/or position of one or more lines along which a light source is reflected by the object (reflection line). Based upon a change, such as, for example, the position and/or shape, to one or more of the reflection lines, the system modifies the shape of the object to correspond to the new surface requirements as defined by one or more of the modified reflection lines, while maintaining the constraint on the object as predetermined by the system or user. The light source may be any type of light source, such as, for example, a linear neon or fluorescent light, or a curved neon or fluorescent light.

The apparatus according to the present invention utilizes a CAD system, and provides for control of the reflection line using a control device, for example, a cursor control device, such as a mouse, a roller ball, a pressure pad, or a capacitance or inductance based pad, or for example, an interactive display device, such as a light pen, or a touch screen. The apparatus includes a processor programmed to determine the shape of the object, for example, a surface or a set of adjacent surfaces, based on either one or more selected reflection lines. The processor can be programmed to use energy minimization algorithms to make these determinations. The processor may also be programmed to determine one or more reflection lines approximating one or more desired reflection lines, which are merely targets for the actual reflection lines, based on an attraction to one or more of the desired reflection lines. This may be implemented using vector-to-vector springs.

By defining one or more reflection lines, a user is effectively and indirectly controlling the shaping of an object by the system. This is useful for all types of object design activities, including, for example, surface design used in aircraft (for example, for critical air flow requirements), auto body design (for example, for aesthetic requirements) and bottle design (for example, perfume bottles). The reflection line is set by the user or reset from a current setting to a defined setting and the system shapes (in the case of a flat or initial surface) or modifies the shape of the surface to correspond to the defined setting, with the defined setting becoming the new setting of the reflection line and the system determined shape or system modified shape becoming the new shape of the surface.

The reflection line and corresponding surface may be modified absolutely, i.e., by imposing on the surface that it include a user input curve as a reflection line, or they may be modified by attraction, i.e., by considering the user input curve to be a target to which the reflection line on the surface is pulled by a force or loading. Each approach has certain advantages and disadvantages. Absolute modification instantly guarantees that the surface will exhibit the desired reflection line. However, by imposing such a strong constraint on this line, the surface can generate undesirable characteristics in other areas, because the system may become overconstrained. Modification by attraction in most cases yields better surface behavior because the reflection line is allowed to deviate slightly from the target in order to avoid an overconstrained condition.

Modification of a surface may be accomplished by user control of the reflection line. The system adjusts the surface to correspond to the new reflection line as defined by the user. The system determines the normal vectors to an imaginary surface, based on a predetermined linear light source and observer, which would correspond to the defined reflection line. The system then adjusts the surface to correspond to the determined normal vectors representing the imaginary surface. Although it is possible for a number of surface shapes to correspond to the defined reflection line, the preferred strategy is to select a shape based on energy minimization. In the scenario of modification by attraction, the adjustment of the surface to correspond to the determined normal vectors may be accomplished by a vector to vector spring load.

A method utilizing energy minimization determines a new shape for the surface based on the lowest change in energy from the shape being modified, such as, for example, an initial flat plane or a previous design. This energy may be defined, for example, as a sum of the integral of stretch and of bending of the surface.

Although there may be a displacement of each point on a surface from a position in space as defined by the original surface to a different position in space as defined by the new surface due to the modification of the surface by the system, such displacements are sufficiently small to allow satisfactory results despite not been taken into account as part of the system's determination.

The system, apparatus and method according to the present invention may be implemented, for example, as computer readable program code and may be contained in or on, or placed into or onto a computer usable medium, such as, for example, a CD ROM, hard drive, computer disc, computer tape, optical storage medium, magnetic storage medium, electronic storage medium, chemical storage medium, EEPROM, RAM, or any other medium now known or which may become known in the future. The system, apparatus and method according to the present invention may also be implemented as a computer program product, such as, for example, a computer file or files, for use with a graphic display or some other display device, such as, for example, a printer or plotter, holographic display, or virtual reality display device, having computer readable program code which can be stored in or on an electrical, magnetic, chemical, optical, mechanical or audio storage medium or any other storage medium now know or which hereinafter becomes known.

The system, apparatus and method according to the present invention may also be transferred via hard copy, electronic transfer, such as, for example, via the internet, intranet, WAN, LAN, email, or via any other medium, such as, for example, any of the media previously described herein, or as a computer data signal embodied in a data stream, such as, for example, a digital, analog or optical data stream.

A more detailed description of preferred embodiments of the present invention is set forth below.

DETAILED DESCRIPTION

Figure 1:
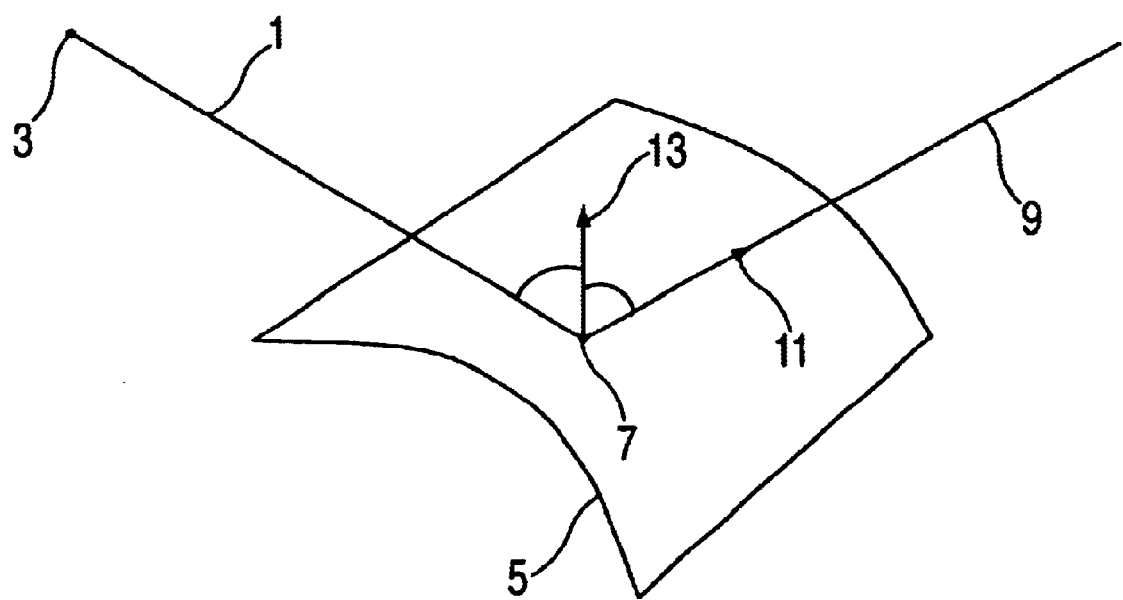
FIG. 1 shows a diagram of a reflection of a point source off a surface.
Figure 2:
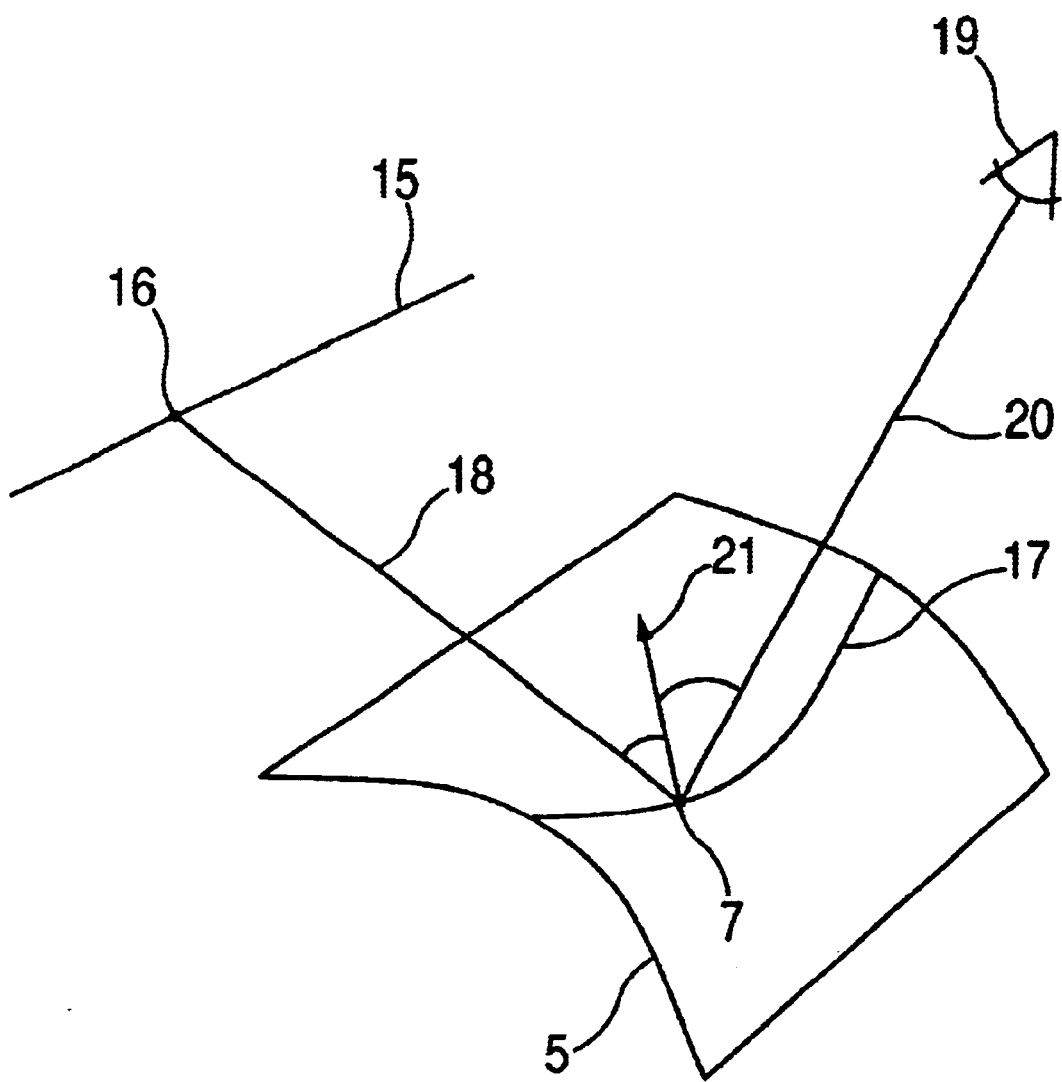
FIG. 2 shows a diagram of a reflection line of a linear light source and a reflection of a point from the light source.

Referring first to FIG. 1, there is shown a diagram of a reflection of a point source off a shaped surface. Light beam 1 originates from a point source 3 and reflects on a surface 5 at a reflection point 7. A normal vector 13 is defined by the surface 5 at reflection point 7, which bisects the angle formed by the light beam 1 and the reflected light beam 9 in direction 11. Referring now to FIG. 2 (the numbering for similar objects will remain the same for all figures), there is shown a diagram of a reflection line of a linear light source 15 and a reflection of a light beam 18 from point 16 of the linear light source 15 off the surface 5 at reflection point 7. The reflection of a linear light source 15, for example, a neon tube, on the surface 5 creates a reflection line 17 as seen by an observer 19. For each point on the reflection line 17 on surface 5 there is a point on the linear light source 15 such that the reflected light beam 20 will be seen by the observer 19 after reflection. The bisector of the angle formed by the light beam 18 and the reflected light beam 20 is the normal vector 21 to the surface 5 at reflection point 7. Simply put, the reflection line 17 is the image of the linear light source 15 on the surface 5, as seen by the observer 19.

Figure 3A:
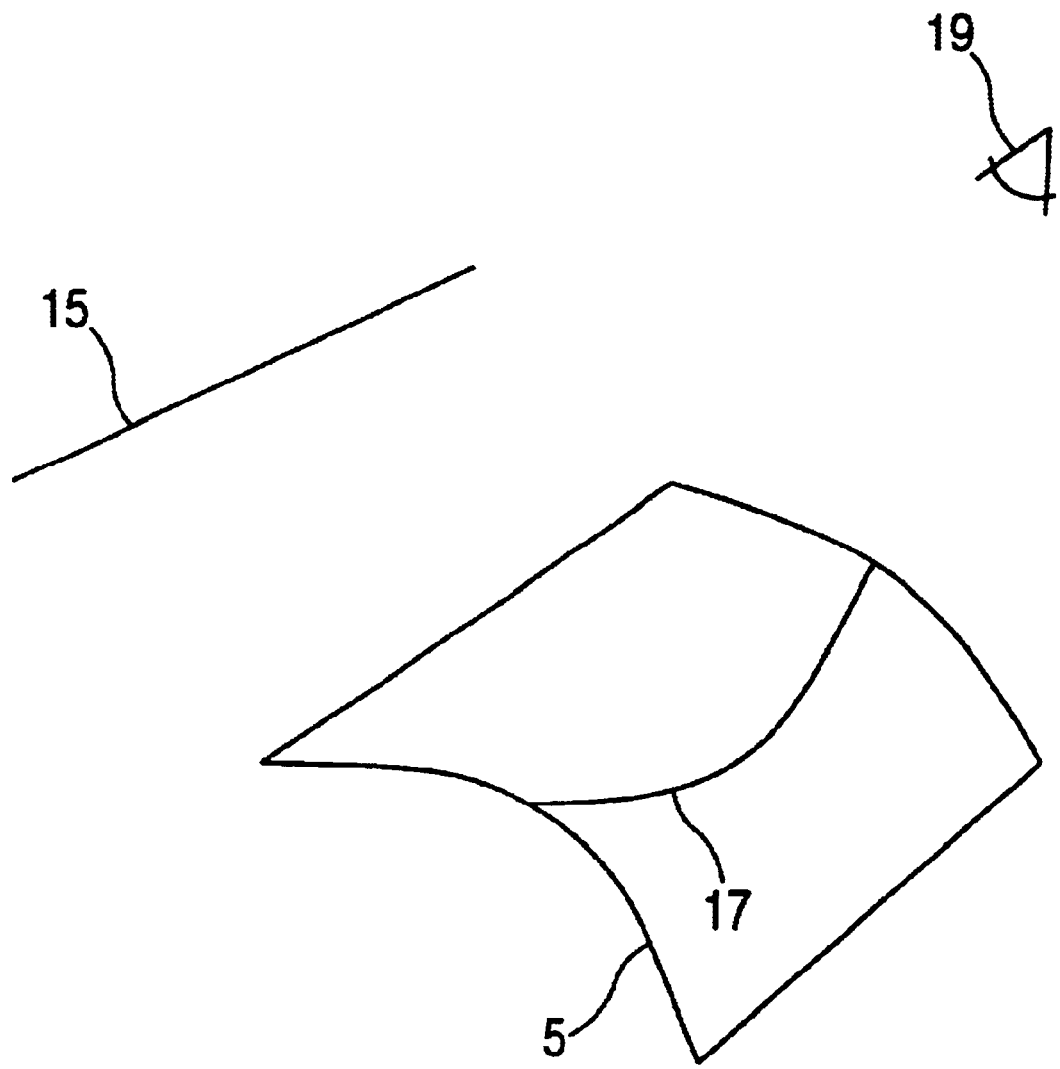
FIGS. 3(a)–(d) show diagrams of a reflection line control process according to an embodiment of the present invention.

Referring to FIGS. 3(a)–(d) there are shown diagrams depicting a reflection line control process according to an embodiment of the present invention. In FIG. 3(a), a reflection line 17 is shown which corresponds to the surface 5, the linear light source 15 and the observer 19. To allow a user to set or adjust the position and/or shape of the reflection line 17, the surface 5 must be modified by the system such that the new reflection line as determined by the user represents a reflection line for the modified surface.

Figure 3B:
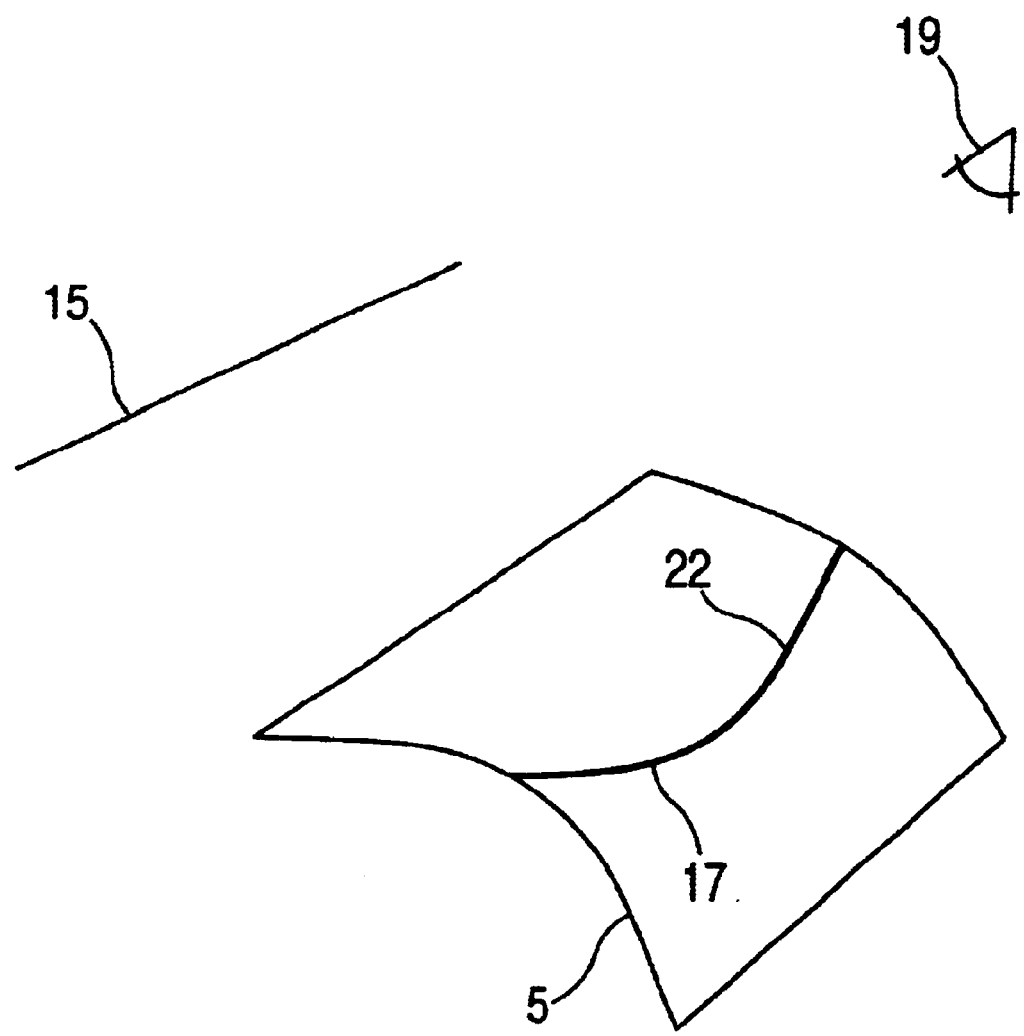
Figure 3C:
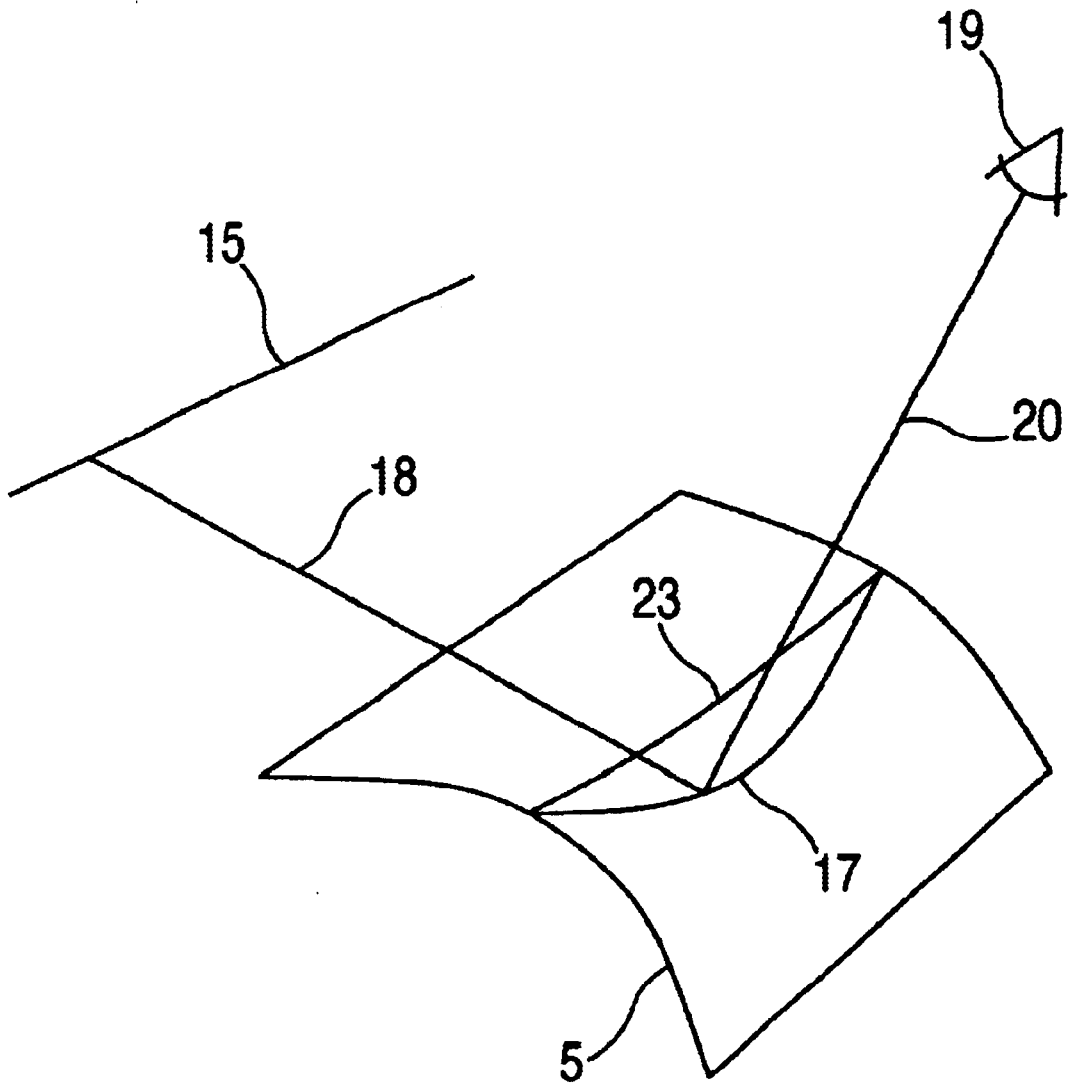
Figure 3D:
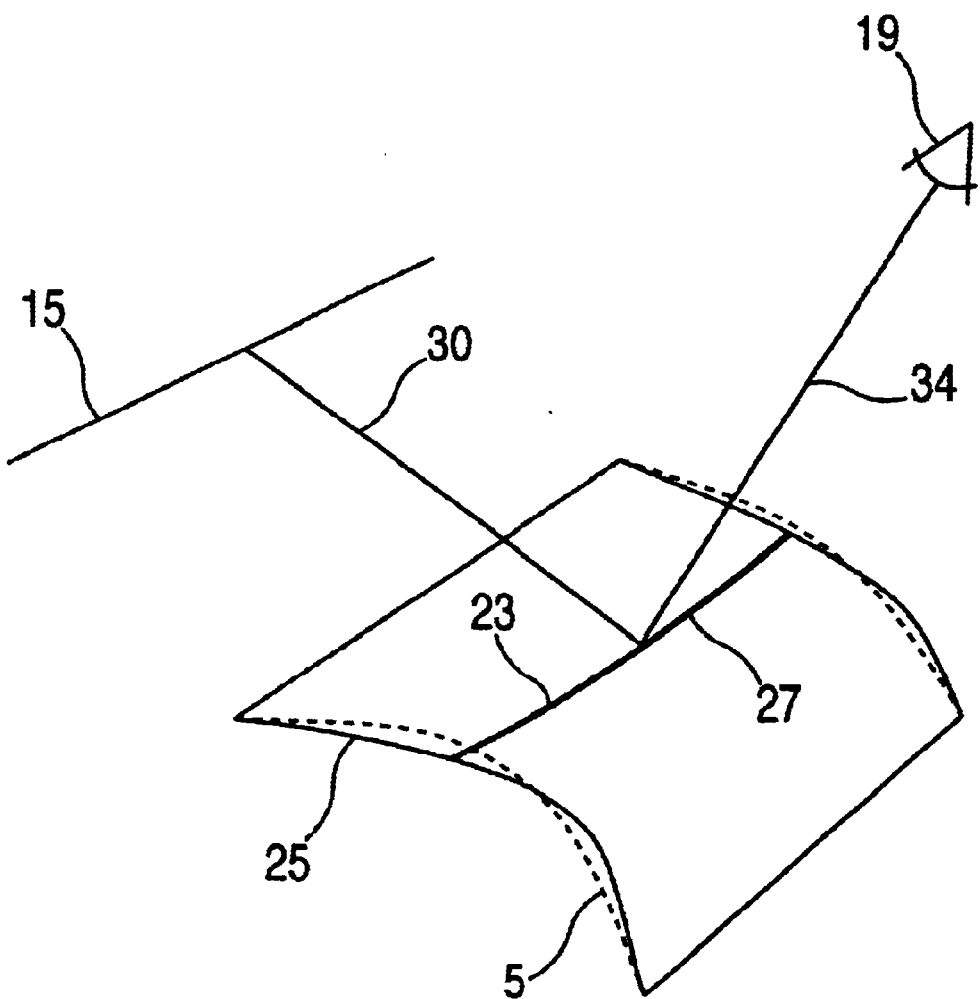

At the beginning of the surface modification process, the user selects a reflection line 17 for modification. As shown in FIG. 3(b), a free-form curve 22 is generated on the surface 5 which is superimposed on the reflection line 17. Both the creation and a deformation of the free-form curve 22 can be accomplished using the tools available in most CAD software systems. For example, free-form curve 22 can be a NURBS that can be deformed by moving its control points or by using an energy based deformation method. As shown in FIG. 3(c), the user then interactively deforms the free-form curve 22 which becomes clearly distinguishable from the reflection line 17. Once the free-form curve 22 is modified by the user into a new free-form curve 23, as can be seen in FIG. 3(d), the system modifies the shape of the surface 5 so that the new shape of the modified surface 25 generates a new reflection line 27 which corresponds to the new free-form curve 23. As a result, the new reflection line 27 becomes visually confused with the new free-form curve 23 as defined by the user. This method can be applied to a plurality of reflection lines corresponding to a plurality of linear light sources, or to a plurality of reflection lines as seen by an observer at a plurality of locations based on a single linear light source.

Although the reflection line 17 is shown in FIG. 3(c) as being distinguishable from the free-form curve 23, in many applications the processing capabilities are sufficiently powerful to modify the surface almost instantaneously such that the reflection line and the free-form curve always appear indistinguishable. Thus, the user may never see a gap between the two.

Figure 4A:
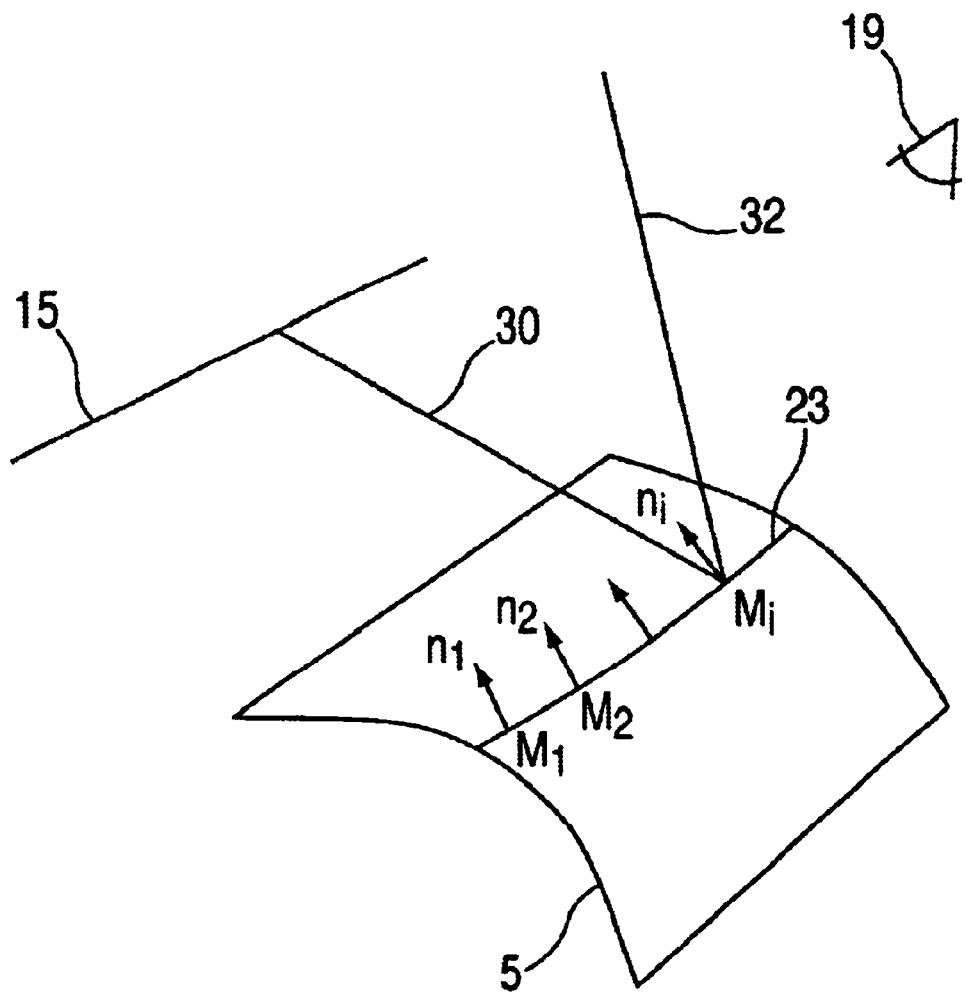
FIGS. 4(a)–(b) show diagrams of a procedure for adjusting a shaped surface to match a defined reflection line according to an embodiment of the present invention.
Figure 4B:
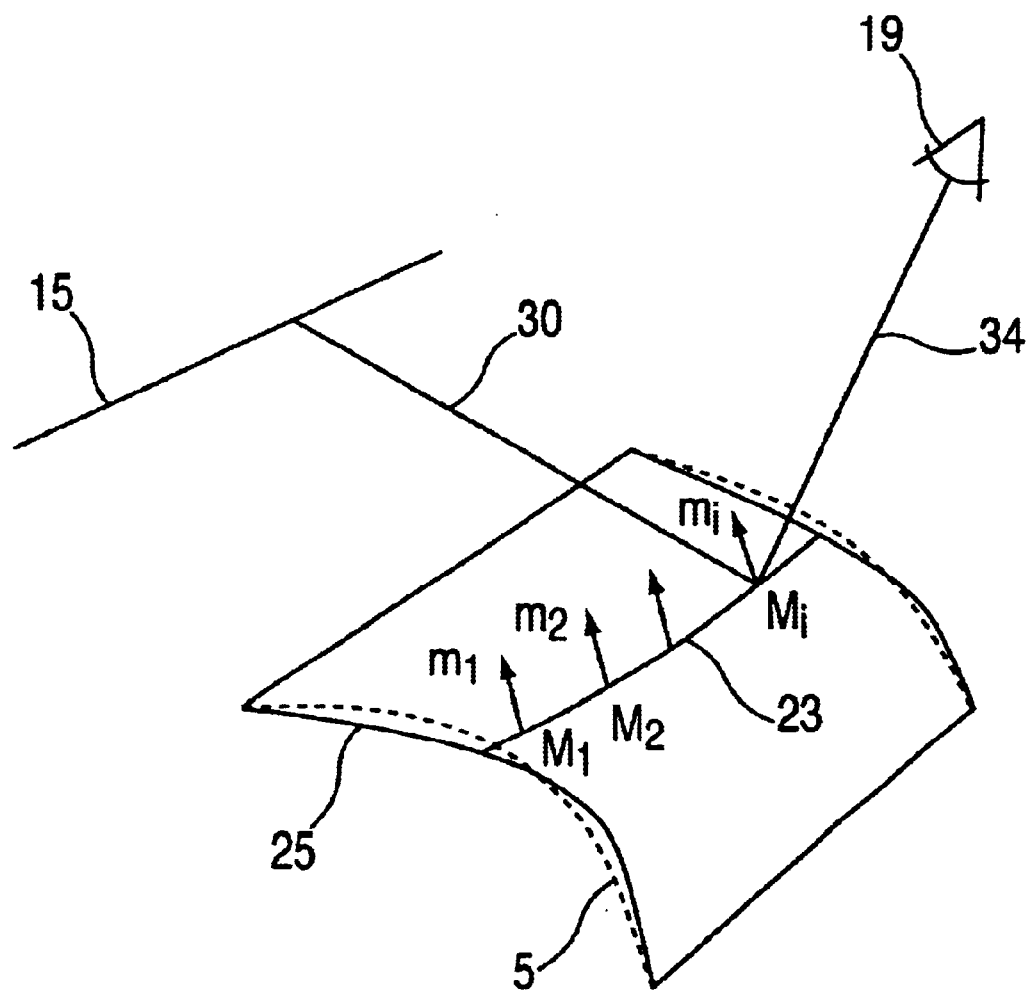

FIGS. 4(a)–(b) show diagrams of a procedure for adjusting a shaped surface to match a user defined reflection line according to an embodiment of the present invention. Referring now to FIG. 4(a), after the free-form curve 22, as shown in FIG. 3(c), is deformed by the user, a new free-form curve 23 is created. As shown in FIG. 4(a), set A is defined as a set of points ($M_i$) on new free-form curve 23, obtained by discretizing new free-form curve 23. Points $M_i$ are defined as points from set A, and vectors $n_i$ are vectors normal to surface 5 at points $M_i$. In general, vectors $n_i$ are such that points $M_i$ are not reflection points of light beams between the linear light source 15 and the observer 19, for example, light beam 30, but rather are reflection points of light beams following different path, for example, the path as shown by reflected light beam 32.

Referring now to FIG. 4(b), as described below new vectors mi are determined by the system such that points $M_i$ would be reflection points of light beams, for example, light beam 30, between the linear light source 15 and the observer 19, as shown for example, by reflected light beam 34, if the normal vectors to the surface 5 at points $M_i$ were vectors $m_i$ and not vectors $n_i$. A new shape for the surface 5 is then determined by the system, for example, using an energy based deformation method (as described below), such that for all points $M_i$ belonging to A, the normal vectors to the new surface 25 at points $M_i$ will be vectors $m_i$.

Although the positions of points $M_i$ will likely change slightly due to deformation of the surface 5, the method described herein provides for an acceptable approximation which results in visual confusion between the new reflection line and the modified free-form curve despite the minor displacement of the reflection line due to surface deformation. Thus, it is not necessary to adjust for the change in the position of the surface as a result of the reflection line modification.

To provide for a minimal amount of undesirable deformations in the surface 5, the shape of the new surface 25 should be as close to the shape of surface 5 as possible while at the same time providing for the user defined modification to the reflection line. To accomplish this, the angle between vector $n_i$, the vector normal to the surface 5 at reflection point $M_i$, as shown in FIG. 4(a), and vector $m_i$, the vector normal to new surface 25 at reflection point $M_i$, as shown in FIG. 4(b) must be small.

Figure 5:
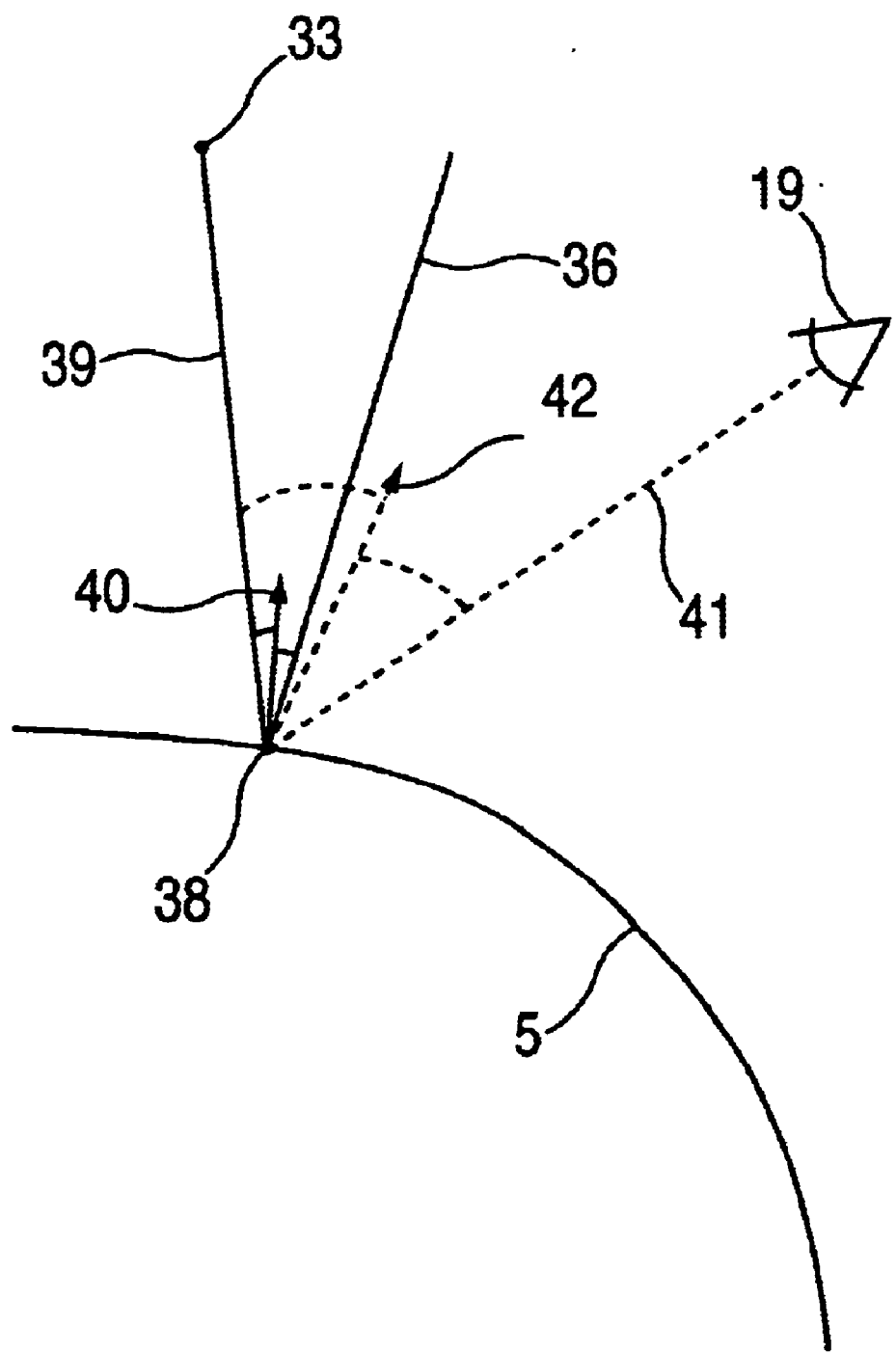
FIG. 5 shows a diagram of a cross-section of a surface containing a normal vector prior to a modification of the surface according to an embodiment of the present invention.

Referring now to FIG. 5, there is shown a diagram of a cross-section of the surface 5 depicting the normal vector 40 and the reflected light beam 36 prior to a modification of the surface 5 according to an embodiment of the present invention. The system determines a new vector 42 such that reflection point 38 would be a reflection point on new surface 25 if the normal vector to the new surface 25 at reflection point 38 was new vector 42 and not vector 40. First, set B is defined as the set of all vectors at a single reflection point, for example, reflection point 38 on the new reflection line 27 corresponding to new-free-form curve 23, where each element of set B corresponds to a different point on a linear light source, for example, linear light source 15. New vector 42 is defined as the vector bisector of the angle formed between the point 33 on the linear light source, reflection point 38 and the observer 19. New vector 42 belongs to set B because a light beam 39 originating from point 33 and reflecting on surface 5 at reflection point 38 would continue on as reflected light beam 41 to the observer 19 if the normal vector at reflection point 38 was new vector 42. Thus, the system is able to select a vector mi from set B corresponding to any point on the linear light source 15.

Figure 6:
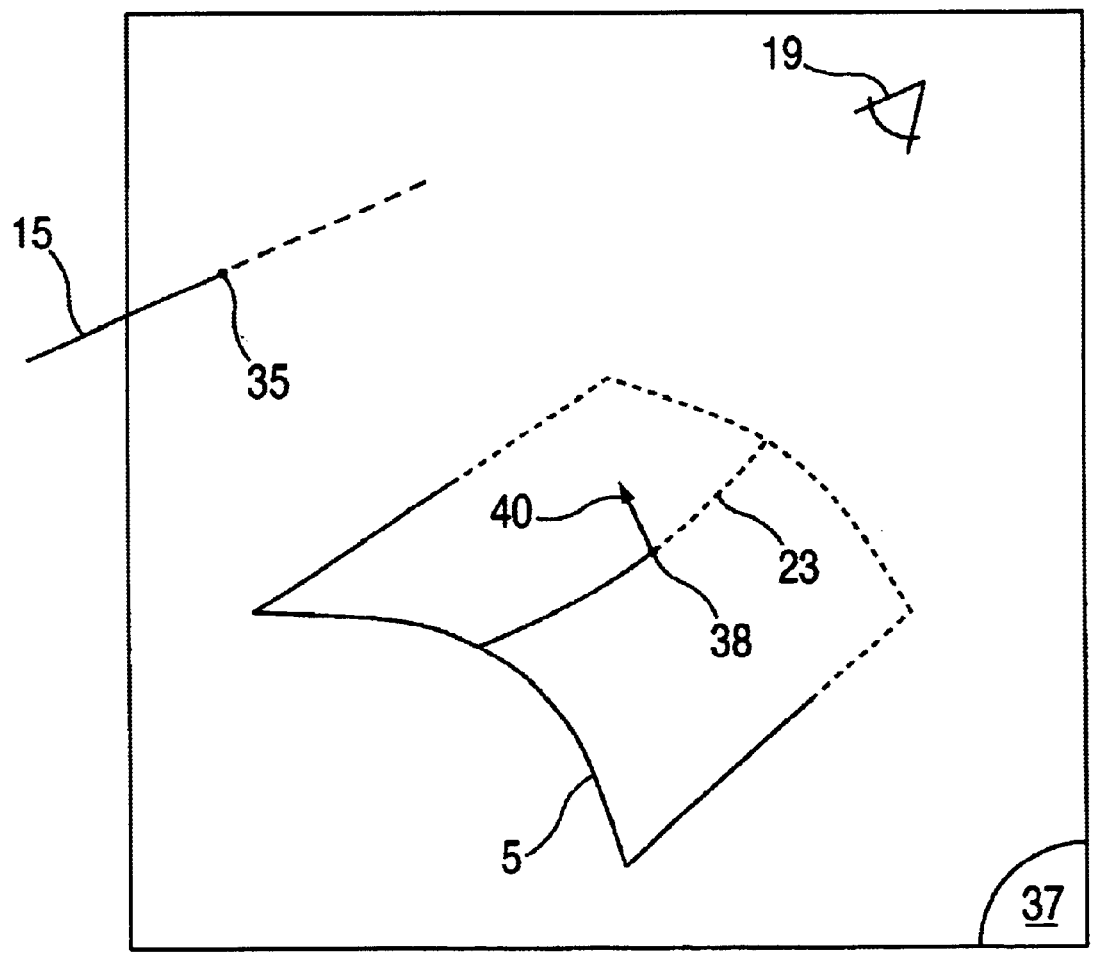
FIG. 6 shows a diagram of a plane upon which a point on the linear light source is selected for determining a normal vector for deformation of a shaped surface according to an embodiment of the present invention.

To locate the points on the linear light source which would allow the system to determine the elements from set B which would define a new surface shape close to the prior surface shape, i.e., a small change between vector $n_i$ and vector $m_{pi}$, the normal vector to the new surface, the system follows the following procedure. Referring to FIG. 6, there is shown a diagram of a plane upon which a point on the linear light source is selected for determining a normal vector for a deformation of a shaped surface according to an embodiment of the present invention. Assuming a linear light source 15, a preferred point 35 on linear light source 15 may be determined. First, a plane 37 is defined as intersecting the observer 19, reflection point 38 on the new free-form curve 23, and vector 40. The preferred point 35 is then defined as the intersection between plane 37 and linear light source 15. Thus, for each point on the new free-form curve 23, a corresponding preferred point on the linear light source 15 may be determined.

Figure 7:
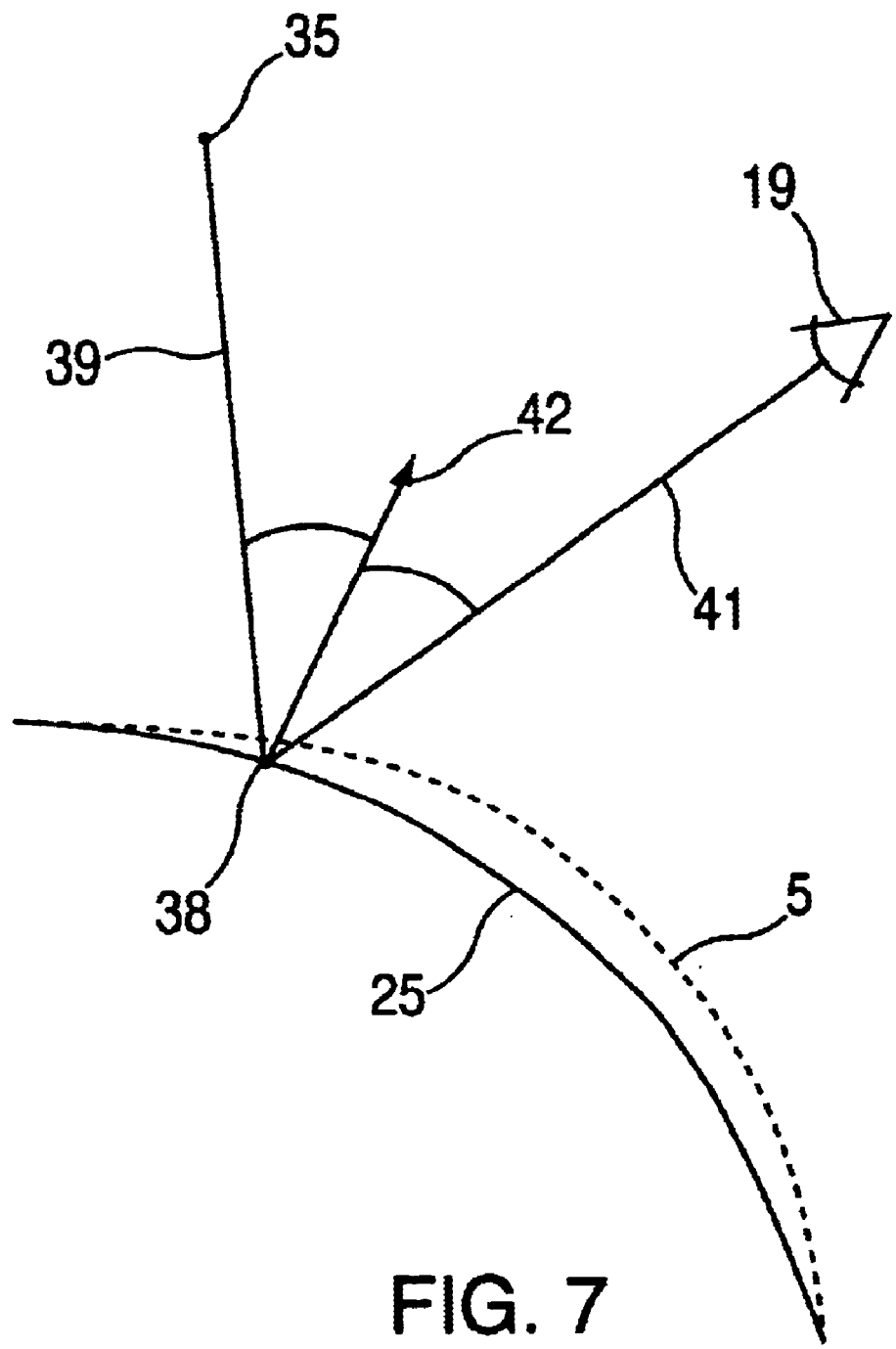
FIG. 7 shows a diagram of a modification of the surface and a new normal vector for the modified surface according to an embodiment of the present invention.

Next, in FIG. 7 is shown a diagram of a modification of the surface and a new normal vector for the modified surface according to an embodiment of the present invention. As determined above with respect to FIG. 6, the normal vector to reflection point 38 on the new free-form curve 23 defined by the user was determined to be new vector 42. At this point, the system must determine a new shape for the surface 5 to correspond to the selection of all vectors $m_{pi}$ for all points on linear light source 15 based on the new free-form curve 23 defined by the user, such that the new reflection line 27 having normal vectors $m_{pi}$ will be superimposed on new free-form curve 23. Although there may be a displacement of each point $M_i$ due to the modification of the surface by the system, such displacements are sufficiently small to allow satisfactory results despite not being taken into account as part of the system's determination.

The advantage to this method is that the user has total control over the reflection line. However, when a large number of constraints are applied to the surface under an energy based deformation method, it may not be possible for the system to generate a smooth shaped surface since there may not exist a smooth shape satisfying all of the required constraints.

Figure 8:
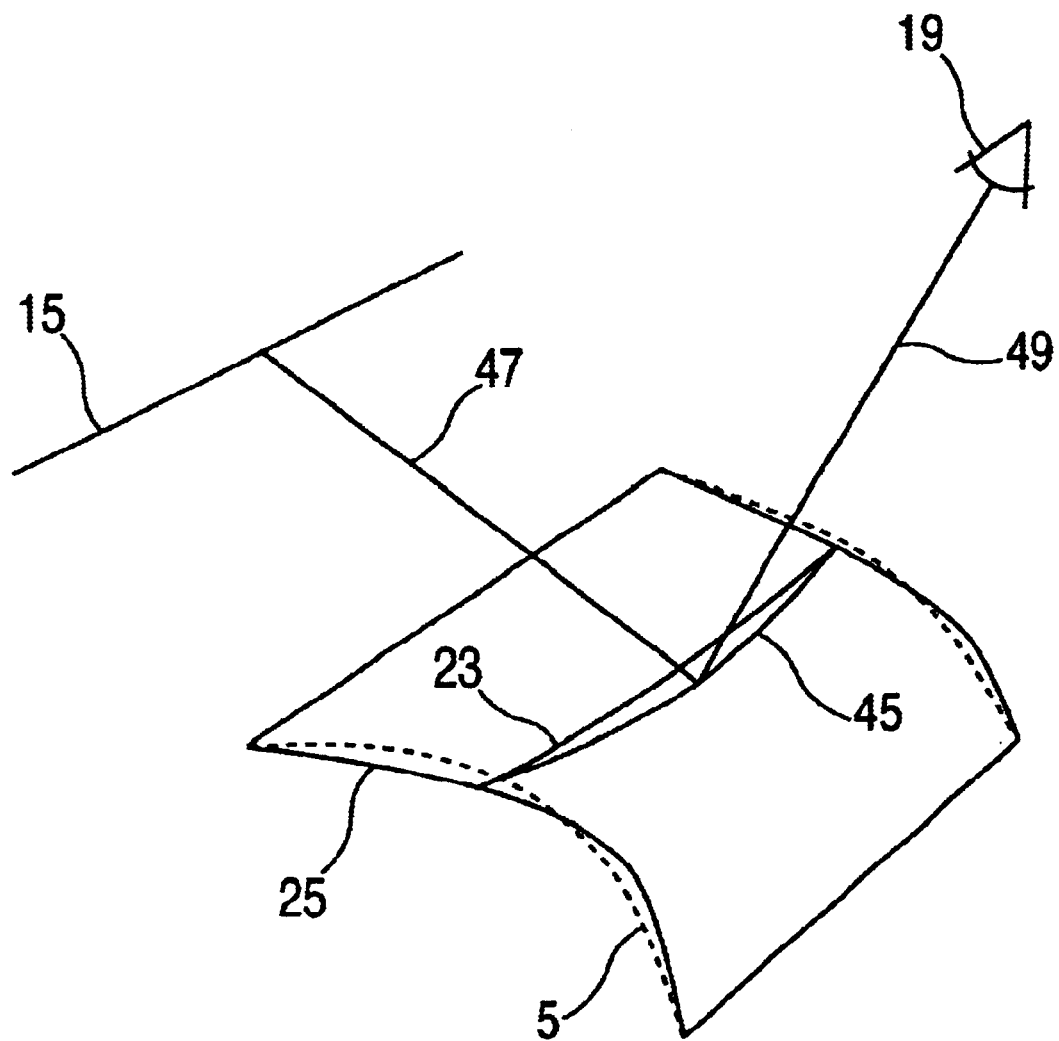
FIG. 8 shows a diagram of an attraction modification of the surface according to an embodiment of the present invention.

Modification of a reflection line may be accomplished using a different method according to the present invention. Referring now to FIG. 8, there is shown a diagram of an attraction modification of the surface according to an embodiment of the present invention. The first few steps are similar to those described above with respect to the previous embodiment. A user selects a reflection line 17 to be modified, as described with respect to FIG. 3(a). A free-form curve 22 is generated on the surface 5 which is superimposed on the reflection line 17, as described with respect to FIG. 3(b). The free-form curve 22 is then modified by the user to create a new free-form curve 23, as described with respect to FIG. 3(c). As shown in FIG. 8, the system modifies the shape of the surface 5, using the method described below, such that the new surface 43 defines a new reflection line 45 which is not superimposed on the new free-form curve 23, but rather merely comes close to or approximates the new free-form curve 23. Under this method, the reflection line is attracted to the free-form curve, allowing a user to interactively modify the shape of the reflection line by simply modifying the shape of the free-form curve.

Figure 9:
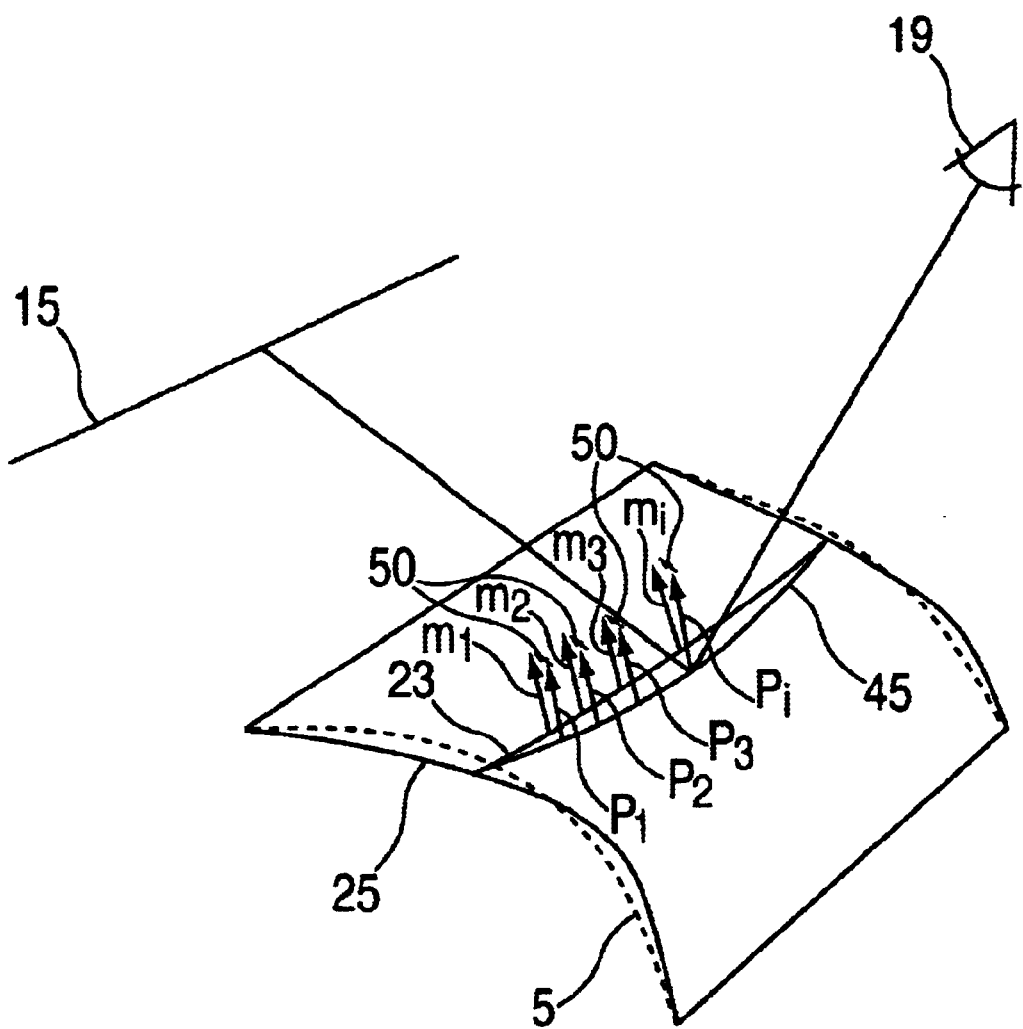
FIG. 9, shows a diagram of an attraction of a reflection line based on the selection by a user of a free-form curve.

Referring now to FIG. 9, there is shown a diagram of an attraction of a reflection line based on the selection by a user of a free-form curve. First, as described above with respect to FIG. 6, the system determines a new vector 42 for new free-form curve 23 such that reflection point 38 would be a reflection point if the normal vector to the surface 5 at reflection point 38 was new vector 42 and not vector 40. Set B is defined as the set of all such new vectors. New vector 42 is defined as the vector bisector of the angle formed between the preferred point 35, reflection point 38 on new free-form curve 23 and the observer 19. New vector 42 belongs to set B because a light beam 39 originating from preferred point 35 and reflecting on surface 5 at reflection point 38 on new free-form curve 23 would continue on as reflected light beam 41 to the observer 19 if the normal vector at reflection point 38 was new vector 42. Thus, the system is able to determine all vectors $m_{pi}$ for new free-form curve 23 corresponding to all points on the linear light source 15.

Next, instead of the normal vectors $p_i$ to the new reflection line being constrained to correspond exactly to the vectors $m_{pi}$ of new free-form curve 23, the system determines "vector-to-vector" springs 50 attracting $p_i$ towards $m_{pi}$ for each i. An energy based deformation method is then used to determine a new shape for surface 5 such that each $p_i$ comes close to the corresponding $m_{pi}$. As a result the new reflection line 45 is not superimposed and visual indistinguishable from the new free-form curve 23, but instead approximates or is near to the new free-form curve 23.

Although this method does not allow a user to select a definitive shape for the new reflection line, it does provide for an attraction or close approximation to such a shape. Moreover, because this method manages the minimization of both the internal energy of the surface and the energy of the springs, through the use of an energy based deformation method, and does not allow for any exact constraints on the normal vectors, it will produce a very smooth surface despite the constraints placed on the surface to be modified by the energy based deformation method.

Reflection line control may be implemented using energy based deformation. This allows a user to deform a surface by making it behave like a physical material. Several types of constraints and loads may be defined, and the shape of the surface is determined by utilizing energy minimization algorithms.

An energy based deformation method as utilized by the system allows a deformation of a surface while enforcing certain constraints, such as, for example, position, tangent or curvature constraints on points or curves of that surface. For example, many design applications require that the four sides of the surface be frozen. This can be accomplished using the energy based deformation method. This method operates by providing that for each shape of the surface a global energy value is defined as a sum of two terms: the internal and the external energy. The internal energy is such that it increases if the surface is affected, such as, for example, by bending or stretching. The external energy corresponds to the loads defined by the user. For example, if the user defines a spring between a point on the surface and a point in space, the corresponding energy will increase as the distance between these two points increases.

A finite element method is then used to determine the shape of the surface for which the global energy is minimum from among all shapes satisfying all of the constraints. The resulting shape will usually be smooth since bumps and surface incongruities tend to increase the internal energy of the surface. This method may be used to find the lowest energy based on a modification of the original or prior shape, or to find the lowest energy from an initial state, i.e., a flat surface.

The second method described above utilizes a load called a vector spring which is similar to a point spring, but instead of linking a point on the surface and a fixed point, it links the normal vector of the surface and a fixed vector.

To utilize the spring on the normal vector of a surface, the system must process certain information. This includes surface information. To begin, the shape of the surface is represented as $w_{total}$, and defined as follows:

$$w_{total}(u, v) = w_{default}(u, v) + w(u, v) \quad (1)$$

$W_{default}(u,v)$ is the default shape of the surface (i.e., its initial shape) and $w(u,v)$ is given by:

$$w(u, v) = \sum_{i=0}^{n} \sum_{j=0}^{m} P_{i,j} N_i(u) N_j(v) \quad (2)$$

which is a conventional tensor-product B-Spline surface formulation, as used by most CAD software, with $P_{ij}$ the grid of control points and $N_{i,p}$ the univariate B-Spline basis functions of order p. This formulation is presented in detail in "The NURBS Book", Piegel and Tiller, 1997.

To construct the spring on a tangent vector the system utilizes certain algorithms. These algorithms were derived from algorithms relating to a point spring.

The energy of the point spring $E_{spring}$ is defined as:

$$E_{spring} = E_{spring}(u^0, v^0, w_{target}, \alpha) = \alpha(w_{total}(u^0, v^0) - w_{target})^2 - \alpha w^2_{target} \quad (3)$$

where the positive number $\alpha$ is the stiffness of the spring, $u^0$ and $v^0$ are the coordinates of the point on the surface which is the moving end of the spring and $w_{target}$ is the position of the fixed end of the spring. Equation 3 yields:

$$E_{spring} = \alpha w^2(u^0, v^0) - 2\alpha(w_{target} - w_{default}(u^0, v^0))w(u^0, v^0) \quad (4)$$

Let $\delta$ be the symbol of Kronecker defined by:

$$\delta_{pq} = 0 \text{ if } p \neq q$$

$$\delta_{pq} = 1 \text{ if } p = q \quad (5)$$

Equation 4 can be written:

$$E_{spring} = x^T K_{spring} x - f^T_{spring} x \quad (6)$$

where $K_{spring}$ is the square matrix of size $3*(n+1)(m+1)$ defined by:

$$(K_{spring})_{3*(i*(m+1)+j)+p, 3*(k*(m+1)+l)+q} = \alpha N_i(u^0) N_j(v^0) N_k(u^0) N_l(v^0) \delta_{pq} \quad (7)$$

for 0 i, k, n, 0 j, l m and 0 p, q 2
and $f_{spring}$ is the vector of size $3*(n+1)(m+1)$ defined by:

$$(f_{spring})_{3*(i*(m+1)+j)+p} = \beta N_i(u^0) N_j(v^0) \quad (8)$$

for 0 i n, 0 j m and 0 p 2
with:

$$\beta = 2\alpha(w_{target} - w_{default}(u^0, v^0)) \quad (9)$$

The spring is incorporated to the system to be solved by adding $K_{spring}$ to $K_\sigma$ and $f_{spring}$ to $f_\sigma$ ($K_\sigma$ and $f_\sigma$ being defined below).

These point spring algorithms were then modified as described below.

To begin, let us call $w_{total,u}(u,s)$ the tangent vector to the surface along the first coordinate u. We define the "tangent vector spring" to be the load corresponding to the energy:

$$E_{u\_spring} = E_{u\_spring}(u^0, v^0, W_{target}, \alpha) = \alpha(w_{total,u}(u^0, v^0) - w_{target})^2 - \alpha w^2_{target} \quad (10)$$

where the positive number $\alpha$ is the stiffness of the spring, $u^0$ and $v^0$ are the coordinates of the point on the surface where the tangent vector is defined and $w_{target}$ is the fixed target vector. Equation 10 yields:

$$E_{u\_spring} = \alpha(dw(u^0, v_0)/du)^2 - 2\alpha(w_{target} - dw_{default}((u^0 v^0)/du)dw(u^0, v^0)/du \quad (11)$$

which can also be written:

$$E_{u\_spring} = x^T K_{u\_spring} x - f^T_{u\_spring} x \quad (12)$$

where $K_{u\_spring}$ is the square matrix of size $3*(n+1)(m+1)$ defined by:

$$(K_{u\_spring})_{3*(i*(m+1)+j)+p, 3*(k*(m+1)+l)+q} = \alpha dN_i(u^0)/du \, N_j(v^0) dN_k(u^0)/du \, N_l(v^0)_{pq} \quad (13)$$

for 0 i, k n, 0 j, l m and 0 p, q 2
and $f_{u\_spring}$ is the vector of size $3*(n+1)(m+1)$ defined by:

$$(f_{u\_spring})_{3*(i*(m+1)+j)+p} = dN_i(u^0)/du N_j(v^0) \quad (14)$$

for 0 i n, 0 j m and 0 p 2
with:

$$= 2(w_{target} - dw_{default}(u^0, v^0)/du) \quad (15)$$

A minimum problem is defined as $$\min(x^T K x - f^T x) \quad (16)$$

where K and f define the stiffness matrix and forcing vector. These terms are defined as follows:

$$K_\sigma = \int_\sigma \Phi^T_b \beta \Phi_b + \Phi^T_s \, du dv \text{ and } f_\sigma = \int_\sigma \Phi^T f \, du dv \quad (17)$$

where $$\Phi_b = \begin{bmatrix} \Phi_{uu} \\ \Phi_{vv} \\ \Phi_{uv} \end{bmatrix}$$

$$\Phi_s = \begin{bmatrix} \Phi_u \\ \Phi_v \end{bmatrix} \text{ and}$$

$$\alpha = \begin{bmatrix} \alpha_{11} & \alpha_{12} \\ \alpha_{12} & \alpha_{22} \end{bmatrix}$$

$$\beta = \begin{bmatrix} \beta_{11} & & \\ & \beta_{22} & \\ & & \beta_{12} \end{bmatrix}$$

and $$= [N_0(u)N_0(v) N_0(u)N_1(v) \ldots N_m(u)N_n(v)]$$

The load is incorporated to the system to be solved by adding $K_{u\_spring}$ to $K$ and $f_{u\_spring}$ to $f$. As its energy $E_{u\_spring}$ is minimum when $w_{total,u}(u^0, v^0)$ is equal to $w_{target}$ and increases when the norm of the difference between these two vectors increases, this load will have the desired effect: to deform the surface so as to attract $w_{total,u}(u^0, v^0)$ towards $w_{target}$.

To identify the spring on the normal vector, the system solves for the following equasions: The normal vector on the surface is given by:

$$n_{total}(u, v) = w_{total, u}(u, v) \times w_{total, v}(u, v) \quad (18)$$

Given a target direction defined with a vector $n_{target}$, we first use the procedure described in the next section to define two vectors $w_{u\_target}$ and $w_{v\_target}$ and a strictly positive number such as:

$$w_{u\_target} \times w_{v\_target} = n_{target} \quad (19)$$

We define the spring on a normal vector of the surface at $(u^0, v^0)$ as the load of energy:

$$E_{n\_spring}(u^0, v^0, n_{target, u, v}) = E_{u\_spring}(u^0, v^0, w_{u\_target, u}) + E_{v\_spring}(u^0, v^0, w_{v\_target, v}) \quad (20)$$

where $_u$ and $_v$ are two positive numbers representing the stiffness of the spring along the u and v directions. As this spring is the combination of two springs attracting the tangent vectors $w_{total,u}$ and $w_{total,v}$ towards $w_{u\_target}$ and $w_{v\_target}$, it will actually attract $n_{total}$ towards $n_{target}$ which is what we want: this load is a "directional" spring, attracting the normal of the surface along a given direction.

Given $n_{target}$ there is an infinite set of possible vectors $w_{u\_target}$ and $w_{v\_target}$: any two vectors belonging to the plane perpendicular to $n_{target}$ and not collinear would do. Nevertheless, since that spring is used in the reflection lines control process, it is desirable to have the successive shapes of the surface be as close as possible to its default shape.

Let $w_{default,u}(u^0,v^0)$ and $w_{default,v}(u^0,v^0)$ be the tangent vectors of the default shape of the surface at $(u^0,v^0)$. the following procedure can be used to provide two vectors $w_{u\_target}$ and $w_{v\_target}$ close to $w_{default,u}(u^0,v^0)$ and $w_{default,v}(u^0,v^0)$, while avoiding large deformations of the surface.

We assume that the default shape of the surface is non degenerate at $(u^0,v^0)$, i.e., that the two tangent vectors are not null and not parallel so that there is one and only one plane P containing those vectors. We also assume in the procedure described below that $n_{target}$ does not belong to P(the contrary is very unlikely in the reflection lines control process because it would correspond to very large deformations, generally not desired by the user).

A construction of $w_{u\_target}$ and $w_{v\_target}$ is as follows:

$$w_{u\_target} = w_{default,u}(u^0, v^0) - (w_{default,u}(u^0, v^0) \cdot n^{target}/n^2_{target}) n_{target} \quad (21)$$

$$w_{v\_target} = w_{default,v}(u^0, v^0) - (w_{default,v}(u^0, v^0) \cdot n_{target}/n^2_{target}) n_{target} \quad (22)$$

We can easily see that $w_{u\_target}$ and $w_{v\_target}$ are not null, not parallel and that they are both perpendicular to $n_{target}$. This implies that there exists a positive number such that formula 19 is true.

What is claimed is:

1. A method for controlling a reflection line in a CAD system, and for adjusting a shape of an object to correspond to a new reflection line, comprising the steps of:
   defining the new reflection line;
   defining at least one constraint on the object other than the new reflection line;
   determining a shape of the object based on the new reflection line and the at least one constraint.

2. The method according to claim 1, wherein the shape of the object is determined using energy minimization.

3. The method according to claim 1, wherein the at least one constraint includes at least one of a position constraint, a tangent constraint, and a curvature constraint.

4. The method according to claim 1, wherein the object is a surface.

5. A method for controlling a reflection line in a CAD system, and for adjusting a shape of an object to correspond to a new reflection line, comprising the steps of:
   defining a desired reflection line;
   defining at least one constraint on the object other than the desired reflection line; and
   determining the shape of the object based on the desired reflection line and the at least one constraint such that a new reflection line is attracted to the desired reflection line.

6. The method according to claim 5, wherein the determination of the shape of the object utilizes vector springs.

7. The method according to claim 5, wherein the determination of the reflection line based on an attraction to the desired reflection line utilizes vector springs.

8. The method according to claim 5, wherein the determination of the reflection line based on an attraction to the desired reflection line utilizes energy minimization.

9. The method according to claim 5, wherein the shape of the object is determined utilizing energy minimization.

10. The method according to claim 5, wherein the at least one constraint includes at least one of a position constraint, a tangent constraint, and a curvature constraint.

11. The method according to claim 5, wherein the object is a surface.

12. A method for controlling a reflection line in a CAD system, and for adjusting a shape of an object to correspond to a new reflection line, comprising the steps of:
   generating a free-form curve corresponding to the reflection line of the object;
   modifying the free-form curve to define the new reflection line;
   generating the new reflection line;
   defining at least one constraint on the object other than the new reflection line; and
   determining the shape of the object based on the new reflection line and the at least one constraint.

13. The method according to claim 12, wherein the shape of the object is determined using energy minimization.

14. The method according to claim 13, wherein the energy minimization is relative to an initial shape of the object.

15. The method according to claim 14, wherein the initial shape of the object is flat.

16. The method according to claim 13, wherein the energy minimization is relative to a prior shape of the object.

17. The method according to claim 12, wherein the at least one constraint includes at least one of a position constraint, a tangent constraint, and a curvature constraint.

18. The method according to claim 12, wherein the object is a surface.

19. A method for controlling a reflection line in a CAD system, and for adjusting a shape of an object to correspond to a new reflection line, comprising the steps of:
   generating a free-form curve corresponding to the reflection line of the object;
   modifying the free-form curve to define a desired reflection line;
   defining at least one constraint on the object other than the desired reflection line; and
   determining the shape of the object based on the desired reflection line and the at least one constraint such that a new reflection line approximates the desired reflection line.

20. The method according to claim 19, wherein the shape of the object is determined using vector springs.

21. The method according to claim 19, wherein the new reflection line is determined using vector springs.

22. The method according to claim 19, wherein the shape of the object is determined using energy minimization.

23. The method according to claim 19, wherein the new reflection line is determined using energy minimization.

24. The method according to claim 19, wherein the object is a surface.

25. A method for controlling a reflection line representative of a reflection of a light source on a surface of an object relative to an observer at a predetermined position, in a CAD system, and for adjusting a shape of the surface to correspond to a new reflection line, comprising the steps of:
- generating a free-form curve corresponding to the reflection line of the surface;
- modifying the free-form curve to define a new reflection line;
- defining at least one of a position constraint, a tangent constraint, and a curvature constraint on the surface;
- determining a new shape of the surface based on the new reflection line and at least one of the position constraint, the tangent constraint, and the curvature constraint, using energy minimization with respect to a prior shape of the surface; and
- generating the new reflection line.

26. A method for controlling a reflection line representative of a reflection of a light source on a surface of an object relative to an observer at a predetermined position, in a CAD system, and for adjusting a shape of the surface to correspond to a new reflection line, comprising the steps of:
- generating a free-form curve corresponding to the reflection line of the surface;
- modifying the free-form curve to define a desired reflection line;
- defining at least one of a position constraint, a tangent constraint, and a curvature constraint on the surface; and
- determining a new shape of the surface based on the desired reflection line and at least one of the position constraint, the tangent constraint, and the curvature constraint, using energy minimization with respect to a prior shape of the surface such that a new reflection line approximates the desired reflection line using vector springs.

27. A method for controlling a plurality of reflection lines in a CAD system, and for adjusting a shape of an object to correspond to a plurality of new reflection lines, comprising the steps of:
- generating a plurality of free-form curves corresponding to the reflection lines of the object;
- modifying the free-form curves to define new reflection lines;
- generating the new reflection lines;
- defining at least one constraint on the object other than the new reflection lines; and
- determining the shape of the object based on the new reflection lines and the at least one constraint.

28. The method according to claim 27, wherein the new reflection lines correspond to a single light source from the perspective of multiple observers at different locations.

29. The method according to claim 27, wherein the new reflection lines correspond to multiple light sources from the perspective of at least one of a single observer, and multiple observers at different locations.

30. A method for controlling a plurality of reflection lines in a CAD system, and for adjusting a shape of an object to correspond to a plurality of new reflection lines, comprising the steps of:
- generating free-form curves corresponding to the reflection lines of the object;
- modifying the free-form curves to define desired reflection lines;
- defining at least one constraint on the object other than the desired reflection lines; and
- determining the shape of the object based on the desired reflection lines and the at least one constraint such that new reflection lines approximate the desired reflection lines.

31. The method according to claim 30, wherein the new reflection lines correspond to a single linear light source from the perspective of multiple observers at different locations.

32. The method according to claim 30, wherein the new reflection lines correspond to multiple linear light sources from the perspective of at least one of a single observer, and multiple observers at different locations.

33. An apparatus for controlling a reflection line in a CAD system, and for adjusting a shape of an object to correspond to a new reflection line, comprising:
- a user control device; and
- a processor programmed to:
  - generate a free-form curve, under control of the user control device, corresponding to the reflection line of the object,
  - modify the free-form curve, under control of the user control device, to define a new reflection line, and
  - determine the shape of the object based on the new reflection line and at least one predetermined constraint on the object.

34. The apparatus according to claim 33, wherein the user control device is a cursor controller.

35. The apparatus according to claim 33, wherein the user control device is an interactive display controller.

36. An apparatus for controlling a reflection line in a CAD system, and for adjusting a shape of an object to correspond to a new reflection line, comprising:
- a user control device; and
- a processor programmed to:
  - generate a free-form curve, under control of the user control device, corresponding to the reflection line of the object,
  - modify the free-form curve, under control of the user control device, to define a desired reflection line, and
  - determining the shape of the object based on the desired reflection line and at least one predetermined constraint on the object such that a new reflection line approximates the desired reflection line.

37. The apparatus according to claim 36, wherein the user control device is a cursor controller.

38. The apparatus according to claim 36, wherein the user control device is an interactive display controller.

39. An article of manufacture comprising:
- a computer usable medium having computer readable program code embodied therein for controlling a reflection line in a CAD system, and for adjusting a shape of an object to correspond to a new reflection line, the computer readable program code in said article of manufacture comprising:
  - computer readable program code for generating a free-form curve corresponding to the reflection line of the object;

computer readable program code for modifying the free-form curve to define a new reflection line;

computer readable program code for generating the new reflection line;

computer readable program code for defining at least one constraint on the object other than the new reflection line; and computer readable program code for determining the shape of the object based on the new reflection line and the at least one constraint.

40. An article of manufacture comprising:

a computer usable medium having computer readable program code embodied therein for controlling a reflection line in a CAD system, and for adjusting a shape of an object to correspond to a new reflection line, the computer readable program code in said article of manufacture comprising:

computer readable program code for generating a free-form curve corresponding to the reflection line of the object;

computer readable program code for modifying the free-form curve to define a desired reflection line;

computer readable program code defining at least one constraint on the object other than the desired reflection line; and computer readable program code for determining the shape of the object based on the desired reflection line and the at least one constraint such that a new reflection line approximates the desired reflection line.

41. A computer program product for use with a graphics display device, said computer program product comprising:

a computer usable medium having computer readable program code embodied therein for controlling a reflection line in a CAD system, and for adjusting a shape of an object to correspond to a new reflection line, the computer readable program code including:

computer readable program code for generating a free-form curve corresponding to the reflection line of the object;

computer readable program code for modifying the free-form curve to define a new reflection line;

computer readable program code for generating the new reflection line;

computer readable program code for defining at least one constraint on the object other than the new reflection line; and computer readable program code for determining the shape of the object based on the new reflection line and the at least one constraint.

42. A computer program product for use with a graphics display device, said computer program product comprising:

a computer usable medium having computer readable program code embodied therein for controlling a reflection line in a CAD system, and for adjusting a shape of an object to correspond to a new reflection line, the computer readable program code including:

computer readable program code for generating a free-form curve corresponding to the reflection line of the object;

computer readable program code for modifying the free-form curve to define a desired reflection line;

computer readable program code defining at least one constraint on the object other than the desired reflection line; and computer readable program code for determining the shape of the object based on the desired reflection line and the at least one constraint such that a new reflection line approximates the desired reflection line.

43. A computer data signal embodied in a data stream comprising data including a representation of a reflection line and for adjusting a shape of an object to correspond to the reflection line, the computer data signal being generated by a method comprising the steps of:

generating a free-form curve corresponding to the reflection line of the object;

modifying the free-form curve to define a new reflection line;

generating the new reflection line;

defining at least one constraint on the object other than the new reflection line; and determining the shape of the object based on the new reflection line and the at least one constraint.

44. A computer data signal embodied in a data stream comprising data including a representation of a reflection line and for adjusting a shape of an object to correspond to a new reflection line, the computer data signal being generated by a method comprising the steps of:

generating a free-form curve corresponding to the reflection line of the object;

modifying the free-form curve to define a desired reflection line;

defining at least one constraint on the object other than the desired reflection line; and determining the shape of the object based on the desired reflection line and the at least one constraint such that a new reflection line approximates the desired reflection line.

* * * * *